United States Patent
Bose et al.

(10) Patent No.: US 9,292,575 B2
(45) Date of Patent: Mar. 22, 2016

(54) DYNAMIC DATA AGGREGATION FROM A PLURALITY OF DATA SOURCES

(75) Inventors: Abhijit Bose, Paramus, NJ (US); Mithkal M. Smadi, Round Rock, TX (US); Jimeng Sun, White Plains, NY (US); Chandra Kumar Velpuri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 12/950,809

(22) Filed: Nov. 19, 2010

(65) Prior Publication Data
US 2012/0130987 A1 May 24, 2012

(51) Int. Cl.
*G06F 17/30* (2006.01)

(52) U.S. Cl.
CPC ................................ *G06F 17/30489* (2013.01)

(58) Field of Classification Search
CPC ................................................ G06F 17/30489
USPC ........................... 707/600, 605, 999.001, 632
See application file for complete search history.

(56) References Cited

U.S. PATENT DOCUMENTS

| 5,822,751 | A | 10/1998 | Gray et al. |
| 6,298,451 | B1 * | 10/2001 | Lin ................................. 714/4.2 |
| 6,366,922 | B1 * | 4/2002 | Althoff ......................... 707/706 |
| 6,424,967 | B1 * | 7/2002 | Johnson et al. |
| 6,484,179 | B1 * | 11/2002 | Roccaforte ................... 707/737 |
| 6,510,420 | B1 | 1/2003 | Cessna et al. |
| 6,714,979 | B1 * | 3/2004 | Brandt et al. ................. 709/225 |
| 7,062,771 | B2 * | 6/2006 | Wall et al. ...................... 719/316 |
| 7,086,085 | B1 * | 8/2006 | Brown et al. ..................... 726/7 |
| 7,146,356 | B2 | 12/2006 | Choi et al. |
| 7,149,736 | B2 | 12/2006 | Chkodrov et al. |
| 7,392,248 | B2 * | 6/2008 | Bakalash et al. |
| 7,945,575 | B2 * | 5/2011 | Cushing et al. ............... 707/760 |
| 7,958,515 | B2 * | 6/2011 | Tcherevik ..................... 719/318 |
| 8,005,791 | B1 * | 8/2011 | Wookey ........................ 707/632 |
| 8,332,428 | B2 * | 12/2012 | Bonneau et al. .............. 707/772 |
| 2004/0064456 | A1 * | 4/2004 | Fong et al. .................... 707/100 |
| 2004/0073596 | A1 | 4/2004 | Kloninger et al. |
| 2004/0133552 | A1 * | 7/2004 | Greenfield et al. ............... 707/1 |
| 2004/0215626 | A1 | 10/2004 | Colossi et al. |
| 2005/0076045 | A1 * | 4/2005 | Stenslet et al. ................ 707/101 |
| 2006/0155789 | A1 * | 7/2006 | Wong et al. ................... 707/204 |
| 2006/0287890 | A1 | 12/2006 | Stead et al. |

(Continued)

OTHER PUBLICATIONS

Singh et al, "A Metadata Catalog Service for Data Intensive Applications", 2003.*

(Continued)

*Primary Examiner* — Brannon W Smith
(74) *Attorney, Agent, or Firm* — Yee & Associates, P.C.; Lisa Ulrich

(57) ABSTRACT

Dynamically aggregating data is provided. A server device receives a subscriber request for a report based on a subset of metadata contained in a data dimensions catalog. The server device analyzes data aggregation requirements from a plurality of data sources for the report based on the subset of metadata defined in the subscriber request. The server device generates a data access plan for movement of data from the plurality of data sources based on the data aggregation requirements for the report. Then, the server device executes the data access plan to fetch the data from the plurality of data sources based on the data aggregation requirements for the report.

17 Claims, 6 Drawing Sheets

(56) References Cited

U.S. PATENT DOCUMENTS

| | | | |
|---|---|---|---|
| 2007/0239711 A1* | 10/2007 | Unnebrink et al. | 707/6 |
| 2008/0059415 A1 | 3/2008 | Bakalash et al. | |
| 2010/0036800 A1* | 2/2010 | Gui et al. | 707/2 |
| 2010/0063958 A1 | 3/2010 | Bakalash et al. | |
| 2011/0035368 A1* | 2/2011 | Cole et al. | 707/714 |
| 2011/0264618 A1* | 10/2011 | Potdar et al. | 707/602 |
| 2012/0054249 A1* | 3/2012 | Batra et al. | 707/803 |
| 2014/0006963 A1* | 1/2014 | Nandy et al. | 715/738 |

OTHER PUBLICATIONS

Mastroianni et al, "Managing Heterogeneous Resources in Data Mining Applications on Grids Using XML-Based Metadata", 2003.*

Fayyad, "Data Mining and Knowledge Discovery in Databases: Implications for Scientific Databases", 1997.*

Chaudhuri et al, "An Overview of Data Warehousing and OLAP Technology", 1997.*

Vassilis Papadimos and David Maier, "Distributed Queries without Distributed State", 2002.*

Vassilis Papadimos et al, "Distributed Query Processing and Catalogs for Peer-to-Peer Systems", 2003.*

Matt Blaze, "The role of trust management in distributed systems security", 2001.*

Tapio Niemi et al, "Constructing an OLAP Cube from Distributed XML Data", 2002.*

Rakshit, "Relational Online Analytical Processing Aggregator", IP.com, IP.com No. IPCOM000173454D, Aug. 6, 2008, pp. 1-12.

Kamp et al., "Database System Support for Multidimensional Data Analysis in Environmental Epidemiology", Database Engineering and Applications Symposium, 1997. IDEAS '97. Proceedings., International, IEEE, 1997, pp. 180-188.

Papadias et al., "Indexing Spatio-Temporal Data Warehouses", Proceedings of the 18th International Conference on Data Engineering, IEEE Computer Society, Washington, DC, USA, 2002, pp. 166-175.

* cited by examiner

DYNAMIC DATA AGGREGATION FROM A PLURALITY OF DATA SOURCES

BACKGROUND

1. Field

The disclosure relates to a computer implemented method, computer system, and computer program product for dynamically aggregating data on-demand from a plurality of data sources without requiring a centralized multidimensional data warehouse.

2. Description of the Related Art

In today's society, an enterprise needs to analyze large volumes of data to operatively determine areas of need. For example, an enterprise requires rapid execution time to complete a data query and allow analysis from a multidimensional data model. Another name for a multidimensional data model is a star schema. A star schema has one central fact table around which a set of other dimension tables are connected.

Typically, data repositories for an enterprise are set up using a four-tier architecture. The first tier is a database layer for physical data models. The second tier is a data access layer for performing extract/transform/load (ETL) data operations in a data warehouse. A data warehouse is a repository, or a collection of resources that can be accessed to retrieve information of an enterprise's electronically stored data. A data warehouse is designed to facilitate data analysis and reporting. The data analysis and reporting may, for example, be performed by business intelligence (BI) software applications. The third layer is a metadata layer for a data directory. Metadata is used to understand the information stored in a data warehouse and has become increasingly important in Web-based services. Metadata describes how, when, and by whom a particular set of data was collected, and how the data is formatted. The metadata may include annotations. The annotations may specify a set of rules about how facts corresponding to data dimensions can be aggregated and/or transformed. A data dimension is a data attribute or element that categorizes each item in a data set into a category, group, or region. Examples of data dimensions are customer data, product data, sales data, date data, location data, and employee data, which an enterprise may be interested in having a business intelligence application analyze and report on regularly. A data dimension provides a means to separate data in a data warehouse and provides structured labeling of information. Finally, the fourth tier is an information access layer comprising reporting and business intelligence applications.

SUMMARY

According to one embodiment of the present invention, a computer implemented method for dynamically aggregating data is provided. A server device receives a subscriber request for a report based on a subset of metadata contained in a data dimensions catalog. The server device analyzes data aggregation requirements from a plurality of data sources for the report based on the subset of metadata defined in the subscriber request. The server device generates a data access plan for movement of data from the plurality of data sources based on the data aggregation requirements for the report. Then, the server device executes the data access plan to fetch the data from the plurality of data sources based on the data aggregation requirements for the report.

According to another embodiment of the present invention, a computer system for dynamically aggregating data is provided. The computer system includes a central processing unit, a computer-readable memory, and a computer-readable storage device. The storage device stores program instructions that when executed by the central processing unit via the memory receive a subscriber request for a report based on a subset of metadata contained in a data dimensions catalog, analyze data aggregation requirements from a plurality of data sources for the report based on the subset of metadata defined in the subscriber request, generate a data access plan for movement of data from the plurality of data sources based on the data aggregation requirements for the report, and execute the data access plan to fetch the data from the plurality of data sources based on the data aggregation requirements for the report.

According to a further embodiment of the present invention, a computer program product for dynamically aggregating data is provided. The computer program product includes a computer-readable storage device(s) and computer-readable program instructions stored on the computer-readable storage device(s). The computer-readable program instructions that when executed by a central processing unit receive a subscriber request for a report based on a subset of metadata contained in a data dimensions catalog, analyze data aggregation requirements from a plurality of data sources for the report based on the subset of metadata defined in the subscriber request, generate a data access plan for movement of data from the plurality of data sources based on the data aggregation requirements for the report; and execute the data access plan to fetch the data from the plurality of data sources based on the data aggregation requirements for the report.

DETAILED DESCRIPTION

Figure 1:
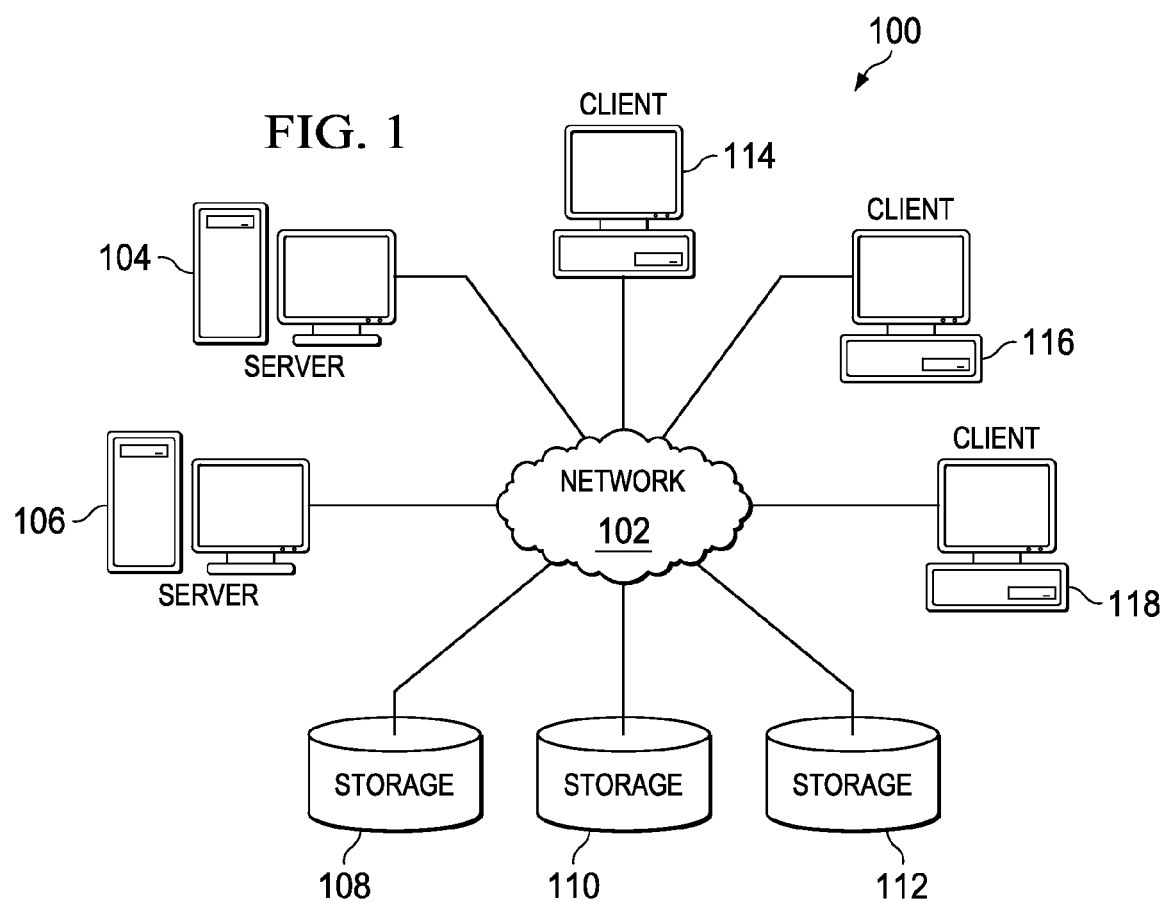
FIG. 1 is a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable storage device(s) having computer-readable program code embodied thereon.

Any combination of one or more computer-readable storage device(s) may be utilized. A computer-readable storage device may be, for example, but not limited to, an electronic, magnetic, optical, or semiconductor system, apparatus, or device, or any suitable combination of the foregoing. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage device may be any tangible medium that can store a program for use by or in connection with an instruction execution system, apparatus, or device. The term "computer-readable storage device" does not encompass a signal propagation media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage device that can direct a computer, other programmable data processing apparatus, or other devices to function in a particular manner, such that the instructions stored in the computer-readable storage device produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
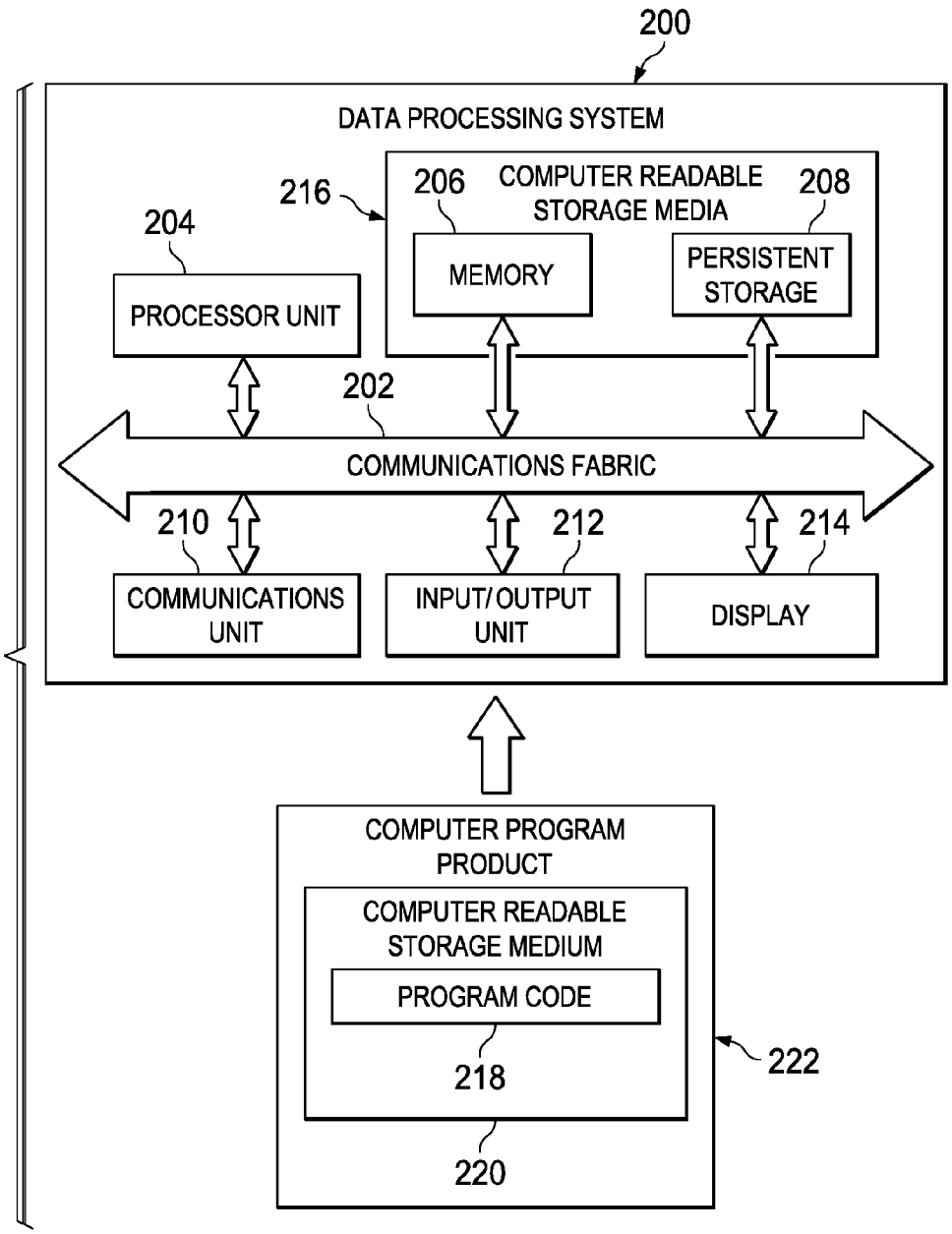
FIG. 2 is a diagram of a data processing system in which illustrative embodiments may be implemented.
Figure 3:
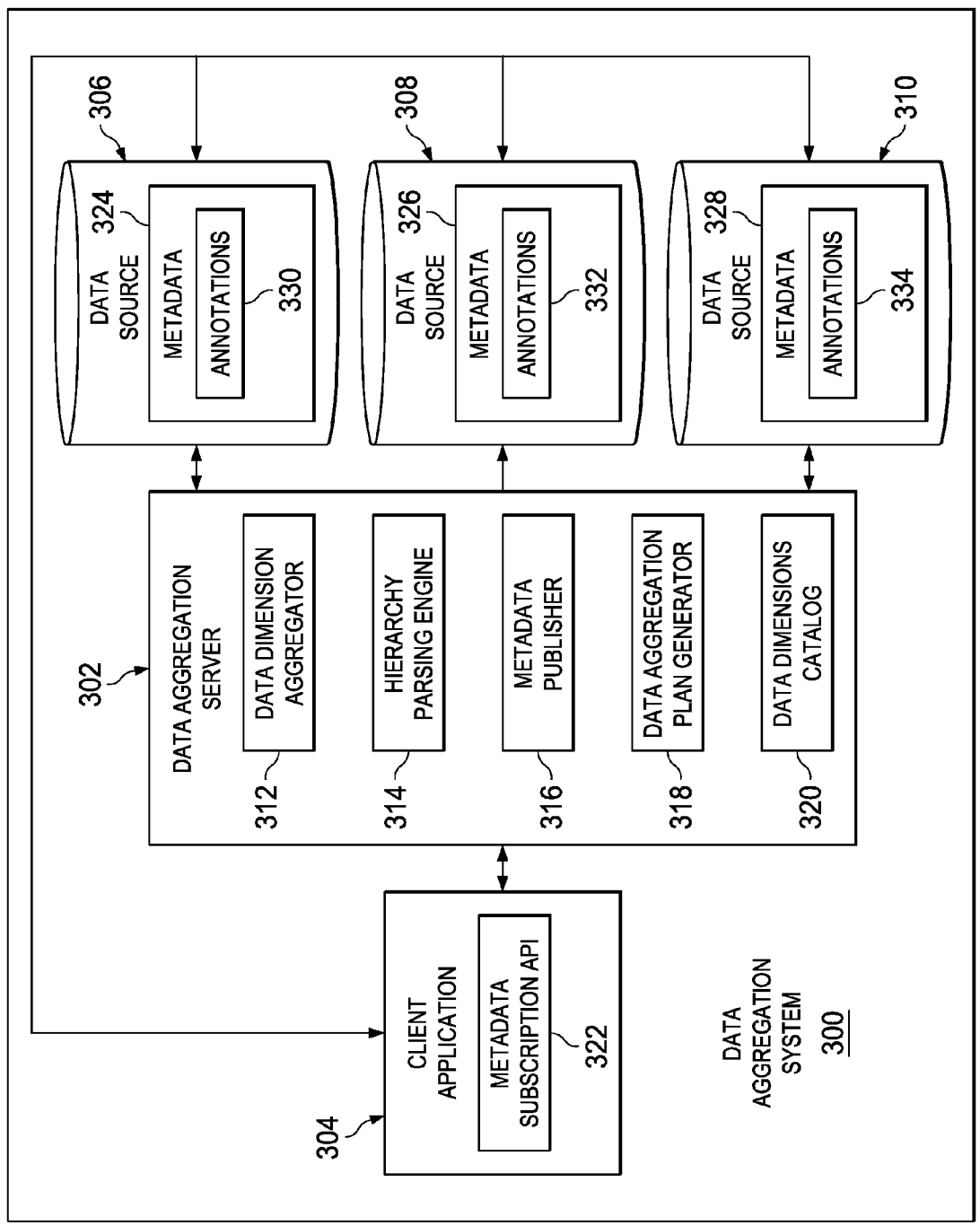
FIG. 3 is a diagram of a data aggregation system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage units 108, 110, and 112. Servers 104 and 106 may, for example, be server devices utilized by one or more data aggregation services. A data aggregation service is a system of hardware and software components used to aggregate data from a plurality of distributed data sources, such as storage units 108, 110, and 112, without utilizing a centralized data warehouse. The distributed data aggregation service may, for example, be implemented as a Web service.

Storage units 108, 110, and 112 are network storage devices capable of storing data in a structured or unstructured format. Storage units 108, 110, and 112 may be local databases, remote databases, or a combination of remote and local databases. Each of storage units 108, 110, and 112 may, for example, represent a redundant array of independent disks (RAID), a storage area network (SAN), a stand-alone storage server, or any combination thereof. Further, storage units 108, 110, and 112 may represent a plurality of other storage units connected to network 102. In addition, storage units 108, 110, and 112 may represent a data warehouse for an enterprise. Alternatively, storage units 108, 110, and 112 may represent a data warehouse for a plurality of different enterprises. The data stored in storage units 108, 110, and 112 may be any type of data. Also, the data may be stored in a plurality of data dimensions.

Furthermore, storage units 108, 110, and 112 may utilize metadata to describe the type of data stored in each of the storage units. Storage units 108, 110, and 112 may, for example, store the metadata in a tree structure. However, it should be noted that the metadata may be stored in any suitable structure or format that may be utilized by illustrative embodiments. Each of storage units 108, 110, and 112 may send their respective metadata to server 104 and/or server 106 for aggregation with the metadata from the other storage units. For example, server 104 and/or server 106 may combine each received metadata tree structure to create a global metadata tree structure for storage units 108, 110, and 112. As a result of creating a global metadata tree structure for storage units 108, 110, and 112, server 104 and/or server 106 know the type of data and the location of the data in each of storage units 108, 110, and 112. Consequently, server 104 and/or server 106 using the global metadata tree structure are able to create a data aggregation plan or a data access plan designed to aggregate data from storage units 108, 110, and 112 to create a report that may be requested by a client business intelligence application running on a client device.

Clients 114, 116, and 118 also connect to network 102. Client computers 114, 116, and 118 may, for example, be personal computers or network computers. In the depicted example, server computer 104 and/or server computer 106 provide information, such as boot files, operating system images, and applications to client computers 114, 116, and 118. Client computers 114, 116, and 118 are clients to server computer 104 and/or server computer 106 in this example. Network data processing system 100 may include additional server computers, client computers, and other devices not shown.

Program code located in network data processing system 100 may be stored on a computer readable storage medium and downloaded to a data processing system or other device for use. For example, program code may be stored on a computer readable storage medium on server 104 and downloaded to client 114 over network 102 for use on client 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 114 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage media 216. Memory 206, in these examples, may, for example, be a random access memory, or any other suitable computer readable storage medium. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for an operating system, applications, and/or programs may be located in computer readable storage media 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, program instructions, or computer readable program instructions that may be read and run by processor unit 204. The program code, in the different embodiments, may be embodied on different physical or computer readable storage media, such as memory 206 or persistent storage 208.

Program code 218 is located in a functional form on computer readable storage medium 220 that is selectively removable and may be loaded onto or transferred to data processing system 200 for running by processor unit 204. Program code 218 and computer readable storage medium 220 form computer program product 222.

In some illustrative embodiments, program code 218 may be downloaded over a network to persistent storage 208 from another device or data processing system via communications unit 210 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing the invention, it was determined that the primary dimensions of the data in a data warehouse change, such as, for example, when a new multidimensional data model or star schema is established to support a new business function or when two organizations merge, all four tiers of the data warehouse are impacted by this change. Standard approaches to updating dimensions of a data warehouse do not automate and scale well. In most cases, all four tiers of the architecture have to be migrated to a new multidimensional data model. When the database layer for a physical data model is built using a relational model, the majority of data queries are often updated to associate with new primary and foreign key relationships of the new multidimensional data model. A major time-consuming work involves the information access layer, where reports and associated metadata models often have to be modified to take advantage of the new dimensional model.

Illustrative embodiments provide a computer implemented method, computer system, and computer program product for dynamically aggregating data on-demand from a plurality of different distributed data sources without requiring a centralized multidimensional data warehouse. Specifically, illustrative embodiments address how to aggregate data from a plurality of different distributed data sources, which may contain both relational and other types of data, such as trees, without requiring a centralized multidimensional data warehouse. In addition, illustrative embodiments keep client business intelligence applications updated regarding any dimensional changes in the plurality of different distributed data sources in near real-time via a subscription program function.

Thus, illustrative embodiments can significantly improve the lifecycle of enterprise dimensional data management and business intelligence application reporting from a plurality of distributed data sources. Illustrative embodiments do not require physical updates to data sources when the dimensional data attributes change for the information access layer of business intelligence applications, such as, for example, when new dimensions are available as a data source. Also, illustrative embodiments keep track of any new dimensions added to a data source and make these new dimensions available to the information access layer of business intelligence applications so that reports can be built dynamically with minimal changes in the business applications.

For example, a business intelligence application may store metadata in a temporary cache for a transient report or may store the metadata in a persistent storage for a permanent report. The stored metadata may be periodically synchronized against metadata stored in a data aggregation server. If network bandwidth becomes a bottleneck (i.e., it is too costly to bring in original data from remote data sources to the query site), query execution may be pushed to a plurality of remote data sources and only summarized data are returned to the query site. The final results are computed at the query site based on the partial results returned from the remote data sources. The plan to access the needed data from the plurality of distributed data sources for a report may be based on metadata aggregation rules and source information optimization. Illustrative embodiments are targeted for large volumes of data contained in a plurality of distributed data sources for an enterprise.

One example of business intelligence reporting may, for example, be information technology service delivery reporting. In this example, the business intelligence application may need to obtain customer-related data dimensions and facts from one data source, service delivery team-related data dimensions and facts from a second data source, and customer and delivery team-related information embedded in service requests and service responses from a third data source. A goal of the business intelligence application may be to produce reports related to quality and productivity of information technology service delivery. For example, one set of business intelligence reports may be median time to service requests by team, country, and customer. Another set of business intelligence reports may be percentage of service levels missed by service line, country, and customer.

Another example of business intelligence reporting may, for example, be health care reporting. In this example, the business intelligence application may need to obtain patient information and service cost from multiple health care providers from one data source and claim data from insurance providers from another data source. A goal of the business intelligence application may be to generate summary reports. For example, one set of business intelligence reports may be cost breakdown by different data dimensions, such as patient age, location/region, and health-care system. Another set of business intelligence reports may be cost breakdown by treatment or procedures. A third set of business intelligence reports may be service cost versus insurance plan allocation.

With reference now to FIG. 3, a diagram of a data aggregation system is depicted in accordance with an illustrative embodiment. Data aggregation system 300 is a system of hardware and software components that are used to aggregate data from a plurality of distributed data sources, without utilizing a centralized data warehouse. Data aggregation system 300 may aggregate data as a service to subscribing clients. The data aggregation service may, for example, be implemented as a Web service.

Data aggregation system 300 includes data aggregation server 302, client application 304, and data sources 306, 308, and 310. Data aggregation server 302 may, for example, be server 104 in FIG. 1 and may be implemented in data processing system 200 in FIG. 2. Data aggregation server 302 resides between client application 304 and data sources 306, 308, and 310 and provides the functionality of illustrative embodiments. For example, data aggregation server 302 orchestrates the processes for a dimensional catalog, publish/subscribe syndication, client application requests for data, and scheduling data movement from a plurality of data sources to fulfill client requests for data by generating a data access plan. Data aggregation server 302 includes data dimension aggregator 312, hierarchy parsing engine 314, metadata publisher 316, data aggregation plan generator 318, and data dimensions catalog 320.

Data aggregation server 302 uses data dimension aggregator 312 to communicate with each of data sources 306, 308, and 310. In other words, data dimension aggregator 312 is a communication component capable of communicating with a plurality of different types of data sources, such as, for example, object-oriented and relational data sources. Data dimension aggregator 312 receives metadata from each of data sources 306, 308, and 310. The metadata provides a summary of the data dimensions stored in each of data sources 306, 308, and 310. The metadata may be provided to data dimension aggregator 312 in a tree structure format. The metadata may also include annotations, which specify aggregation rules for data dimensions.

Data aggregation server 302 uses hierarchy parsing engine 314 to combine the metadata tree structures from each of data sources 306, 308, and 310. Hierarchy parsing engine 314 combines the metadata tree structures from each of data sources 306, 308, and 310 to generate a global metadata tree structure that includes all the metadata from data sources 306, 308, and 310. Data aggregation server 302 uses data dimensions catalog 320 to store the global metadata tree structure.

Data dimensions catalog 320 is a database that maintains all available facts and dimensions across an enterprise, along with the associated metadata and annotations. Data dimensions catalog 320 is updated by data aggregation server 302 whenever any change in dimensional information is received from data sources 306, 308, and 310 as part of a data model lifecycle. In addition, data dimensions catalog 320 stores information regarding which data dimensions are to be shared with which client application. Data dimensions catalog 320 may, for example, be stored in a storage device, such as persistent storage 208 in FIG. 2.

Data aggregation server 302 uses metadata publisher 316 to publish a list of all available data dimensions from which a report may be generated to subscribing client applications. Metadata publisher 316 may, for example, publish data dimension information on a regular time interval basis, on-demand by subscribing clients, and/or when updated metadata or data dimension information is received by data aggregation server 302 from data sources 306, 308, and 310. Data aggregation server 302 uses data aggregation plan generator 318 to generate a data access plan for fetching data requested by a subscriber client from data sources 306, 308, and 310. The data access plan includes data access requirements to fetch appropriate data from an appropriate data source to fulfill a client subscriber data request.

Client application 304 may reside in a client device, such as client 114 in FIG. 1. In this example, client application 304 is a subscribing client to data aggregation server 302. Client application 304 may, for example, be a business intelligence application, a reporting application, a financial application, or any other type of business analysis application. Client application 304 may specify which metadata client application 304 wants from metadata publisher 316 in order to generate a report. In other words, client application 304 may subscribe to only a portion or a subset of the global metadata tree structure because client application 304 knows what metadata is required to produce a specific report.

Client application 304 includes metadata subscription application programming interface 322. An application programming interface (API) is an interface implemented by a software program which enables it to interact with other software. Client application 304 utilizes metadata subscription application programming interface 322 to interact with components of data aggregation server 302. Metadata subscription application programming interface 322 may, for example, provide a real-time feed to and from components in data aggregation server 302 in order to subscribe to or search for available data dimensions. In other words, metadata subscription application programming interface 322 may provide client application 304 with a means to be notified of new dimensional information on-demand.

Data sources 306, 308, and 310 may be local data sources, remote data sources, or a combination of local and remote data sources. Data sources 306, 308, and 310 may, for example, be storage units 108, 110, and 112 in FIG. 1 respectively. Data sources 306, 308, and 310 include metadata 324, 326, and 328, respectively. Metadata 324, 326, and 328 provide a description of the data contained in each of data sources 306, 308, and 310. In addition, metadata 324, 326, and 328 include annotations 330, 332, and 334, respectively. Annotations 330, 332, and 334 extend the data dimensions by adding attributes, properties, data movement rules, and data aggregation rules.

It should be noted that data aggregation server 302 only stores and maintains metadata, for example, that describes data from data sources 306, 308, and 310. In other words, data aggregation server 302 does not function as a centralized data warehouse by storing data, for example, that is contained in data sources 306, 308, and 310. Also, it should be noted that data aggregation server 302 may also function as an authentication sever. In other words, data aggregation server 302 may validate requests prior to processing a data request from a client application or prior to processing a request to update metadata in a data dimensions catalog from a data source.

Figure 4:
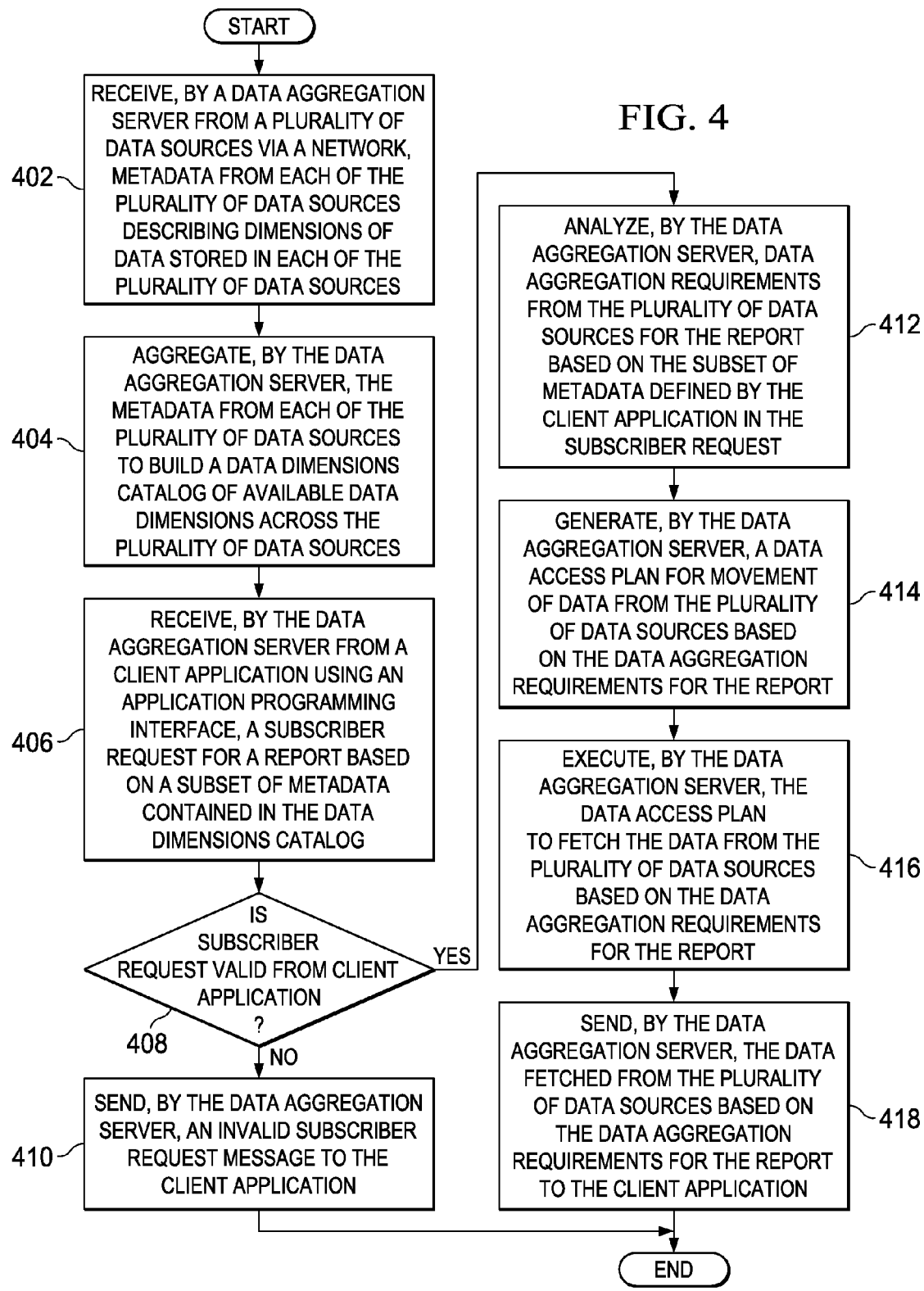
FIG. 4 is a flowchart illustrating a process for dynamically aggregating data from a plurality of distributed data sources in accordance with an illustrative embodiment.

With reference now to FIG. 4, a flowchart illustrating a process for dynamically aggregating data from a plurality of distributed data sources is shown in accordance with an illustrative embodiment. The process shown in FIG. 4 may be implemented in a data aggregation server, such as data aggregation server 302 in FIG. 3.

The process begins when the data aggregation server receives metadata from each of a plurality of data sources, such as data sources 306, 308, and 310 in FIG. 3. The data aggregation server can receive meta data from each of the plurality of data sources via a network, such as network 102 in FIG. 1 (block 402). The plurality of data sources may be remote databases, local databases, or a combination of remote and local databases. In addition, the plurality of data sources may be relational databases, object-oriented databases, or a combination of both relational and object-oriented databases. The metadata, such as metadata 324, 336, and 338 in FIG. 3, describes dimensions of data stored in each of the plurality of data sources. The metadata may include annotations, such as annotations 330, 332, and 334 in FIG. 3.

Also, the data aggregation server may determine whether each of the data sources is authorized to update a data dimensions catalog, such as data dimensions catalog 320 in FIG. 3, with metadata. The data dimensions catalog includes all available data dimensions across the plurality of data sources. The metadata from the plurality of data sources contained within the data dimensions catalog may, for example, be stored in a global metadata tree structure that combines different metadata tree structures from the plurality of data sources. In determining whether each of the data sources is authorized to update the data dimensions catalog, the data aggregation server may require a username and password from each of the data sources. In response to receiving the username and password, the data aggregation server may perform a validation process to determine whether the received username and password from a particular data source is valid. In response to determining that a username and password is invalid, the data aggregation sever may reject or discard the received metadata. It should be noted that the data aggregation server may use other types of validation processes to authenticate a data source, such as, for example, the use of public and private keys.

In response to receiving the metadata from each of the plurality of data sources at block 402, the data aggregation server aggregates the metadata from each of the plurality of data sources to build the data dimensions catalog (block 404). At block 406, the data aggregation server receives from a client application using an application programming interface a subscriber request for a report based on a subset of metadata contained in the data dimensions catalog (block 406). The client application may, for example, be client application 304 in FIG. 3. The client application may be executing on a client device, such as client 114 in FIG. 1. The application programming interface may, for example, be metadata subscription application programming interface 322 in FIG. 3.

In response to receiving the subscriber request at block 406, the data aggregation server makes a determination as to whether the subscriber request from the client application is valid (block 408). The data aggregation server may, for example, use username and password or public and private keys to authenticate a subscriber request from a client application. In response to determining that the subscriber request is not valid, no output of block 408, the data aggregation server sends an invalid subscriber request message to the client application (block 410) and the process terminates.

In response to determining that the subscriber request is valid, yes output of block 408, the data aggregation server analyzes data aggregation requirements from the plurality of data sources for the report based on the subset of metadata defined by the client application in the subscriber request (block 412). Data aggregation requirements are the prerequisites for determining how to fetch and aggregate the necessary data from the plurality of data sources to fulfill the request for information. In response to analyzing the data requirements for the report at block 412, the data aggregation server generates a data access plan for movement of data from the plurality of data sources based on the data aggregation requirements for the report (block 414).

At block 416, the data aggregation server executes the data access plan to fetch the data from the plurality of data sources based on the data aggregation requirements for the report. In response to executing the data access plan to fetch the data from the plurality of data sources at block 416, the data aggregation server sends the data fetched from the plurality of data sources based on the data aggregation requirements for the report to the client application (block 418) and the process terminates.

In an alternative embodiment, the data aggregation server may send the data access plan to the client application for execution. In another alternative embodiment, the data aggregation server may send the data access plan to the plurality of data sources, along with client connection information, in order for the plurality of data sources to send the requested data directly to the client application instead of to the data aggregation server. The client connection information provides a network connection path for the data sources to communicate with the client application.

Figure 5:
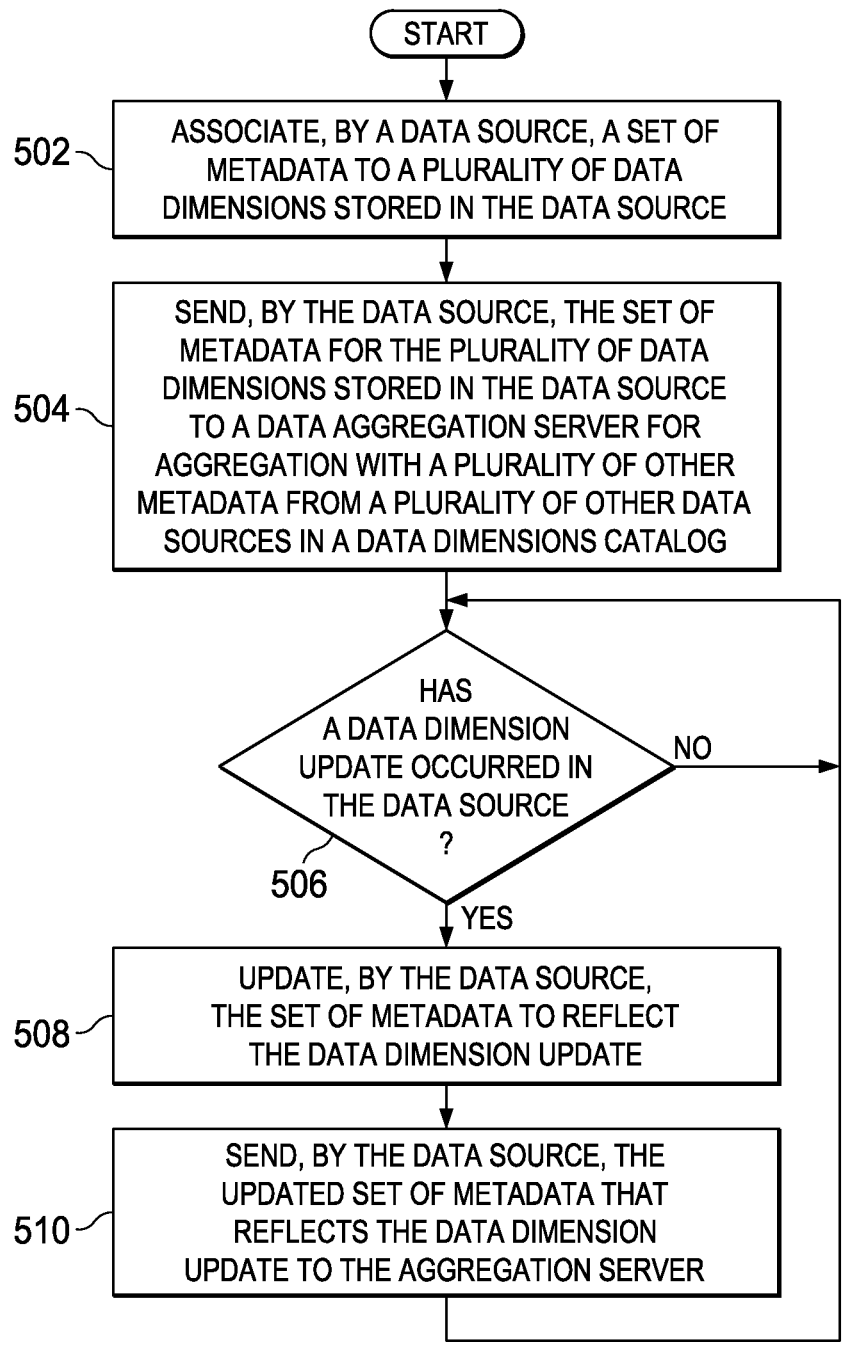
FIG. 5 is a flowchart illustrating a process for updating metadata by a data source in accordance with an illustrative embodiment.

With reference now to FIG. 5, a flowchart illustrating a process for updating metadata by a data source is shown in accordance with an illustrative embodiment. The process shown in FIG. 5 may be implemented in a data source, such as data source 306 in FIG. 3.

The process begins when the data source associates a set of metadata to a plurality of data dimensions stored in the data source (block 502). The set of metadata may, for example, be metadata 324 in FIG. 3. The data source may store the set of metadata in a tree structure. In response to associating the set of metadata to the plurality of data dimensions stored in the data source at block 502, the data source sends the set of metadata for the plurality of data dimensions stored in the data source to a data aggregation server, such as data aggregation server 302 in FIG. 3, for aggregation with a plurality of other metadata from a plurality of other data sources in a data dimensions catalog, such as data dimensions catalog 320 in FIG. 3 (block 504).

At block 506, the data source makes a determination as to whether a data dimension update occurred in the data source (block 506). A data dimension update may, for example, include the addition of a new data dimension to the data source, the modification of an already existing data dimension in the data source, or the deletion of a data dimension from the data source. In response to determining that a data dimension update did not occur in the data source, no output of block 506, the process returns to block 506 where the data source waits for a data dimension update to occur in the data source. In response to determining that a data dimension update did occur in the data source, yes output of block 506, the data source updates the set of metadata to reflect the data dimension update (block 508).

In response to updating the set of metadata at block 508, the data source sends the updated set of metadata that reflects the data dimension update to the data aggregation server (block 510). In response to the data source sending the updated set of metadata that reflects the data dimension update to the data aggregation server at block 510, the process returns to block 506 where the data source waits for a data dimension update to occur in the data source.

Figure 6:
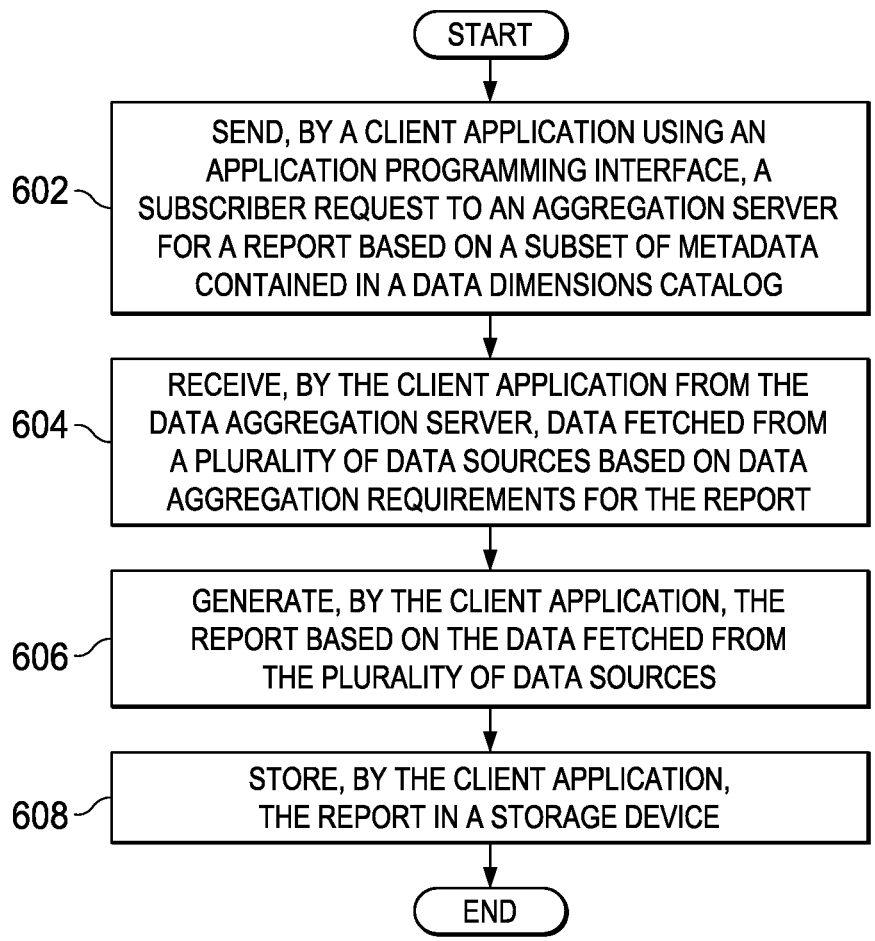
FIG. 6 is a flowchart illustrating a process for generating a report by a client application in accordance with an illustrative embodiment.

With reference now to FIG. 6, a flowchart illustrating a process for generating a report by a client application is shown in accordance with an illustrative embodiment. The process shown in FIG. 6 may be implemented in a client application, such as client application 304 in FIG. 3. The client application may, for example, reside in a client device, such as client 114 in FIG. 1.

The process begins when the client application using an application programming interface sends a subscriber request to a data aggregation server for a report based on a subset of metadata contained in a data dimensions catalog (block 602). The application programming interface may, for example, be metadata subscription application programming interface 322 in FIG. 3. The data aggregation server and the data dimensions catalog may, for example, be data aggregation server 302 and data dimensions catalog 320 in FIG. 3.

In response to sending the subscriber request at block 602, the client application receives from the data aggregation server data fetched from a plurality of data sources based on data aggregation requirements for the report (block 604). Alternatively, at block 604 the client application may receive the fetched data directly from the plurality of data sources, themselves. At block 606, the client application generates the report based on the data fetched from the plurality of data sources. At block 608, the client application stores the report in a storage device. Alternatively, at block 608 the client application may store the report in a temporary cache. In addition, the client application may output the report to a display device, such as display 214 in FIG. 2, or to a printing device. The process terminates thereafter.

Thus, illustrative embodiments of the present invention provide a computer implemented method, computer system, and computer program product for dynamically aggregating data on-demand from a plurality of different distributed data sources without requiring a centralized multidimensional data warehouse. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for dynamically aggregating data, the method comprising:
   receiving, by a data aggregation server implemented between a plurality of remote subscribing client applications and a plurality of distributed remote databases, from each distributed remote database in the plurality of distributed remote databases via a network, tree structure metadata describing data dimensions of data stored in a respective distributed remote database and specifying aggregation requirements for the data dimensions, each of the plurality of distributed remote databases including a set of data dimensions describing a set of facts;
   aggregating, by the data aggregation server, the tree structure metadata received from all of the distributed remote databases in the plurality of distributed remote databases to build a global metadata tree structure in a data dimensions catalog of available data dimensions across the plurality of distributed remote databases;
   publishing, by the data aggregation server, a list of available data dimensions from which reports are generated to the plurality of remote subscribing client applications via the network;
   receiving, by the data aggregation server, a subscriber request for a report based on a subset of metadata within the global metadata tree structure of the data dimensions catalog, the subscriber request being received from a remote subscribing client application using a metadata subscription application programming interface that provides a real-time data feed to and from components in the data aggregation server in order to subscribe to or search for the available data dimensions;
   responsive to receiving the subscriber request, analyzing, by the data aggregation server, data aggregation requirements from a set of distributed remote databases for the report based on the subset of metadata defined by the remote subscribing client application in the subscriber request;
   generating, by the data aggregation server, a data access plan based on the subset of raetadata for movement of data from the set of distributed remote databases based on the analyzing of the data aggregation requirements for the subset of metadata; and
   sending, by the data aggregation server, the data access plan to the plurality of distributed remote databases along with connection information of the remote subscribing client application, the connection information providing a network connection path for the plurality of distributed remote databases to send requested data directly to the remote subscribing client application instead of to the data aggregation server.

2. The method of claim 1 further comprising:
   receiving an updated set of metadata from a remote database that reflects a data dimensions update in the remote database.

3. The method of claim 1 wherein the data aggregation server provides a distributed data aggregation service to the plurality of remote subscribing client applications without utilizing a centralized multidimensional data warehouse.

4. The method of claim 1 wherein the remote subscribing subscriber client application communicates with the data aggregation server via the metadata subscription application programming interface that provides the real-time data feed between the remote subscribing client application and the data aggregation server.

5. The method of claim 1 further comprising:
   authenticating, by the data aggregation server, the subscriber request from the remote subscribing client application using public and private keys.

6. The method of claim 1, wherein the plurality of distributed remote databases includes one or more relational databases and one or more object-oriented databases.

7. The method of claim 1 further comprising:
   responsive to determining that one or more of the plurality of distributed remote databases are not authorized to update the data dimensions catalog with metadata, discarding, by the data aggregation server, received metadata from the one or more distributed remote databases not authorized.

8. A data aggregation server dynamically aggregating data, the data aggregation server comprising:
   one or more processors, one or more computer-readable memories, and one or more computer-readable storage devices and program instructions, stored on at least one of the one or more storage devices fir execution by at least one of the one or more processors via at least one of the one or more memories, the program instructions comprising:
   program instructions to receive, by the data aggregation server implemented between a plurality of remote subscribing client applications and a plurality of distributed remote databases, from each distributed remote database in the plurality of distributed remote databases via a network, tree structure metadata describing data dimensions of data stored in a respective distributed remote database and specifying aggregation requirements for the data dimensions, each of the plurality of distributed remote databases including a set of data dimensions describing a set of facts;
   program instructions to aggregate, by the data aggregation server, the tree structure metadata received from all of the distributed remote databases in the plurality of distributed remote databases to build a global metadata tree structure in a data dimensions catalog of available data dimensions across the plurality of distributed remote databases;

program instructions to publish a list of available data dimensions from which reports are generated to the plurality of remote subscribing client applications via the network;

program instructions to receive a subscriber request for a report based on a subset of metadata within the global metadata tree structure of the data dimensions catalog, the subscriber request being received from a remote subscribing client application using a metadata subscription application programming interface that provides a real-time data feed to and from components in the data aggregation server in order to subscribe to or search for the available data dimensions;

program instructions to analyze data aggregation requirements from a set of distributed remote databases for the report based on the subset of metadata defined by the remote subscribing client application in the subscriber request in response to receiving the subscriber request;

program instructions to generate a data access plan based on the subset of metadata for movement of data from the set of distributed remote databases based on analyzing the data aggregation requirements for the subset of metadata; and program instructions to send the data access plan to the plurality of distributed remote databases along with connection information of the remote subscribing client application, the connection information providing a network connection path for the plurality of distributed remote databases to send requested data directly to the remote subscribing client application instead of to the data aggregation server.

9. The data aggregation server of claim 8 further comprising:
program instructions to authenticate the subscriber request from the remote subscribing client application using public and private keys.

10. The data aggregation server of claim 8, wherein the plurality of distributed remote databases includes one or more relational databases and one or more object-oriented databases.

11. The data aggregation server of claim 8 further comprising:
program instructions to discard received metadata from one or more of the plurality of distributed remote databases not authorized to update the data dimensions catalog with metadata in response to determining that the one or more of the plurality of distributed remote databases are not authorized to update the data dimensions catalog with metadata.

12. A computer program product for dynamically aggregating data, the computer program product comprising:
one or more non-transitory computer-readable storage devices and program instructions, stored on at least one of the one or more non-transitory computer-readable storage devices, the program instructions comprising:

program instructions to receive, by a data aggregation server implemented between a plurality of remote subscribing client applications and a plurality of distributed remote databases, from each distributed remote database in the plurality of distributed remote databases via a network, structure metadata describing data dimensions of data stored in a respective distributed remote database and specifying aggregation requirements for the data dimensions, each of the plurality of distributed remote databases including a set of data dimensions describing a set of facts;

program instructions to aggregate, by the data ag)˜re ration server, the tree structure metadata received from all of the distributed remote databases in the plurality of distributed remote databases to build a global metadata tree structure in a data dimensions catalog of available data dimensions across the plurality of distributed remote databases;

program instructions to publish a list of available data dimensions from which reports are generated to the plurality of remote subscribing client applications via the network;

program instructions to receive a subscriber request for a report based on a subset of metadata within the global metadata tree structure of the data dimensions catalog, the subscriber request being received from a remote subscribing client application using a metadata subscription application programming interface that provides a real-time data feed to and from components in the data aggregation server in order to subscribe to or search for the available data dimensions;

program instructions to analyze data aggregation requirements from. a set of distributed remote databases for the report based on the subset of metadata defined by the remote subscribing client application in the subscriber request in response to receiving the subscriber request;

program instructions to generate a data access plan based on the subset of metadata fbr movement of data from the set of distributed remote databases based on analyzing the data aggregation requirements for the subset of metadata; and program instructions to send the data access plan to the plurality of distributed remote databases along with connection information of the remote subscribing client application, the connection information providing a network connection path for the plurality of distributed remote databases to send requested data directly to the remote subscribing client application instead of to the data aggregation server.

13. The computer program product of claim 12 further comprising:
program instructions to receive an updated set of metadata from a remote database that reflects a data dimensions update in the remote database.

14. The computer program product of claim 12 further comprising:
program instructions to provide a distributed data aggregation service to the plurality of remote subscribing client applications without utilizing a centralized multi-dimensional data warehouse.

15. The computer program product of claim 12 further comprising:
program instructions to authenticate the subscriber request from the remote subscribing client application using public and private keys.

16. The computer program product of claim 12, wherein the plurality of distributed remote databases includes one or more relational databases and one or more object-oriented databases.

17. The computer program product of claim 12 further comprising:
program instructions to discard received metadata from one or more of the plurality of distributed remote databases not authorized to update the data dimensions catalog with metadata in response to determining that the one or more of the plurality of distributed remote databases are not authorized to update the data dimensions catalog with metadata.

* * * * *